United States Patent
Brisebois et al.

(10) Patent No.: US 6,219,679 B1
(45) Date of Patent: Apr. 17, 2001

(54) ENHANCED USER-INTERACTIVE INFORMATION CONTENT BOOKMARKING

(75) Inventors: Michel A. Brisebois; Jobe Roberts, both of Wakefield (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/040,272

(22) Filed: Mar. 18, 1998

(51) Int. Cl.⁷ .................................................. G06F 17/21
(52) U.S. Cl. .......................... 707/501; 707/512; 707/513
(58) Field of Search ................... 707/512, 1, 10, 707/501, 500, 513; 709/218

(56) References Cited

U.S. PATENT DOCUMENTS

| | | | |
|---|---|---|---|
| 5,408,659 | * 4/1995 | Cavendish et al. | 717/1 |
| 5,659,729 | * 8/1997 | Nielsen | 395/603 |
| 5,787,295 | * 7/1998 | Nakao | 395/761 |
| 5,801,702 | * 9/1998 | Dolan et al. | 345/357 |
| 5,854,630 | * 12/1998 | Nielsen | 345/352 |
| 5,860,074 | * 1/1999 | Rowe et al. | 707/526 |
| 5,870,549 | * 2/1999 | Bobo, II | 395/200.36 |
| 5,897,644 | * 4/1999 | Nielsen | 707/513 |
| 5,918,237 | * 6/1999 | Montalbano | 707/513 |
| 5,963,950 | * 10/1999 | Nielsen et al. | 707/102 |
| 6,061,695 | * 5/2000 | Slivka et al. | 707/513 |

FOREIGN PATENT DOCUMENTS

WO 9729414 A2 * 8/1997 (WO).

OTHER PUBLICATIONS

"Internal Placemarks for Uniform Resource Locator Bookmark Operations." IBM Technical Disclosure Bulletin, Jan. 1998, vol. 41, Issue 1. ©1998. pp. 687–688.*

"Online Publication Editing System." IBM Technical Disclosure Bulletin, Jun. 1993. vol. 36, Issue 6A. ©1993. pp. 533–538.*

Campbell et al., Teach Yourself Dynamic HTML in a week, Sams.net Publishing, p. 125, 1997.*

Oliver et al., Sams'Teach Youself HTML 4 in 24 Hours, 2d ed., Sams.net Publishing, p. 183, 1997.*

Taber et. al., Surfing the Internet with Netscape Navigator 3, 3d ed., SYBEX, p. 84, 1996.*

* cited by examiner

*Primary Examiner*—Joseph H. Feild (57) ABSTRACT

A system and method for providing improved bookmarking of remotely provided user-interactive information such as WWW page content are provided. When a bookmark of a page is created, in addition to storing a remote file access pointer such as a universal resource locator, a locator element is stored which identifies a particular subset of the page. When the bookmark is subsequently accessed, only the updated particular subset is displayed, thereby eliminating the need for users to repeatedly scroll through material in which they are not interested. A super-bookmarking option is provided which provides for a bookmark which results in the display of a collage of previously created bookmarked material.

24 Claims, 10 Drawing Sheets

| Text | URL |
|---|---|

Fig. 2
PRIOR ART

| Text | URL | PX1, PY1 |
|---|---|---|

Fig. 3A

| Text | URL | PX1, PY1 | PX2, PY2 |
|---|---|---|---|

Fig. 3B

| Text | URL | PX1, PY1 | WX, WY |
|---|---|---|---|

Fig. 3C

| Text | URL | SX | SY |
|---|---|---|---|

Fig. 3D

| Text | URL | Item Identitier |
|---|---|---|

Fig. 3E

| Text | URL | Locator Element |
|---|---|---|

Fig. 3F

| Text | Bookmark 1 | Bookmark2 | Bookmark3 |
|---|---|---|---|
|  | BX1, BY1 | BX2, BY2 | BX3, BY3 |

ENHANCED USER-INTERACTIVE INFORMATION CONTENT BOOKMARKING

FIELD OF THE INVENTION

The invention relates to the bookmarking of user-interactive information accessed over a communication network.

BACKGROUND OF THE INVENTION

It is common for computer users to access user-interactive information content over a communication network. The most prevalent example of this today involves the access of HTML (hyper-text mark-up language) files over the WWW (world wide web). User-interactive information content such as HTML files may be referenced over the communications network of interest with a file pointer which in the case of HTML files is referred to as a URL (universal resource locator). Typically, due to size limitations of the screen and/or window being used to view the user-interactive information content, only a portion of the content, which may include text and graphics for example, may be displayed at any instant. The amount of data content which may be viewed may depend upon physical limitations of the screen, or upon a limitation imposed due to the size of a window in which the contents are being viewed, this window size being selected by the user. The remainder of the content may be viewed by scrolling which causes different portions of the content to be displayed.

Conventional web browsing software has bookmarking functionality which allows the URL of frequently accessed WWW pages to be stored for convenient retrieval. It is frequently the case that within a page, it will be desirable to access a particular portion repeatedly. For example, some stock quote web pages feature several advertisements at the top, followed by some other useless information, and followed finally by the stock quotes appearing in a box. The box may appear in the same location within the page each time the page is accessed. Each time a user accesses the quotes, he must scroll down past the advertisements, and possibly widen or lengthen the window size to show the entire quote box.

Typically, these scroll positions and window sizes are stored only in temporary memory, and then erased from that memory when the windows are closed. This means that the user must perform the same scrolling and window-resizing each time a particular portion of a page is to be viewed. This problem is most severe in screens having physical screen-size limitations because the scrolling function may be slow.

SUMMARY OF THE INVENTION

It is an object of the invention to obviate or mitigate one or more of the above identified disadvantages.

According to a first broad aspect, the invention provides a method of providing enhanced user-interactive information content bookmarking in the context of page access from a remote service provider. In the process of creating a bookmark a page is accessed having a remote access file pointer. A create enhanced bookmark option is then selected. The remote access file pointer is stored in a bookmark directory record. The bookmark directory record includes a locator element which enables an identification of a subset of the page. In the process of using a bookmark a previously created enhanced bookmark record is selected. The page identified in the remote access file pointer of the selected bookmark is downloaded into memory, and the subset of the downloaded page is displayed.

According to a second broad aspect, the invention provides a method of providing enhanced bookmarking in the context of accessing a page of user-interactive information content from a remote service provider. A superbookmark is first created by selecting a plurality of bookmarks each containing a respective remote access file pointer. In the process of using such a superbookmark. A previously created superbookmark is selected. A page identified in the remote access file pointer of each of the bookmarks identified by the superbookmark is downloaded and a respective subset of each of the downloaded pages is displayed.

According to a third broad aspect, the invention provides a method of providing enhanced bookmarking in the context of accessing a page of user-interactive information content from a remote service provider. A user first creates a plurality of enhanced bookmarks. A superbookmark record is created by selecting a plurality of enhanced bookmarks. In the process of using a superbookmark a previously created superbookmark is selected. The page Identified in the remote access file pointer of each of the enhanced bookmark identified by the superbookmark is downloaded into memory, and the subset of each of the downloaded pages is displayed.

According to a fourth broad aspect, the invention provides an enhanced bookmarking system for use in a processing platform connectable to a service provider for providing enhanced bookmarking of pages of user-interactive information content. The processing platform is connected to a display. The system has a memory for storing enhanced bookmark records, each record containing a remote access file pointer and at least one locator element. A browser is provided for accessing a page having a remote access file pointer and displaying the page on the display. The browser has a create enhanced bookmark option which when selected stores the remote access file pointer of the currently displayed page and at least one locator element in a new bookmark directory record in the memory. The browser also has an access bookmark option which provides for the selection of a particular one or the bookmark records in the memory, which upon selection of a particular bookmark downloads into memory the page identified in the file access pointer of the selected bookmark record and displays on the display a subset of the downloaded page, the subset being determined by the at least one locator element.

According to a fifth broad aspect, the invention provides a superbookmarking system for use in a processing platform connectable to a service provider for providing enhanced bookmarking of pages of user-interactive information content. The processing platform is connected to a display. The system has a memory for storing a super-bookmark record, a selecting mechanism for selecting a plurality of user-interactive information content pages each having a remote access file pointer. The processing platform stores the remote access file pointers in the super-bookmark record. There is also a browser having an access super-bookmark option which provides for the selection of a super-bookmark record, which upon selection downloads into memory the pages identified in the remote file access pointers of the selected superbookmark record and displays on the display each downloaded page.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1A:
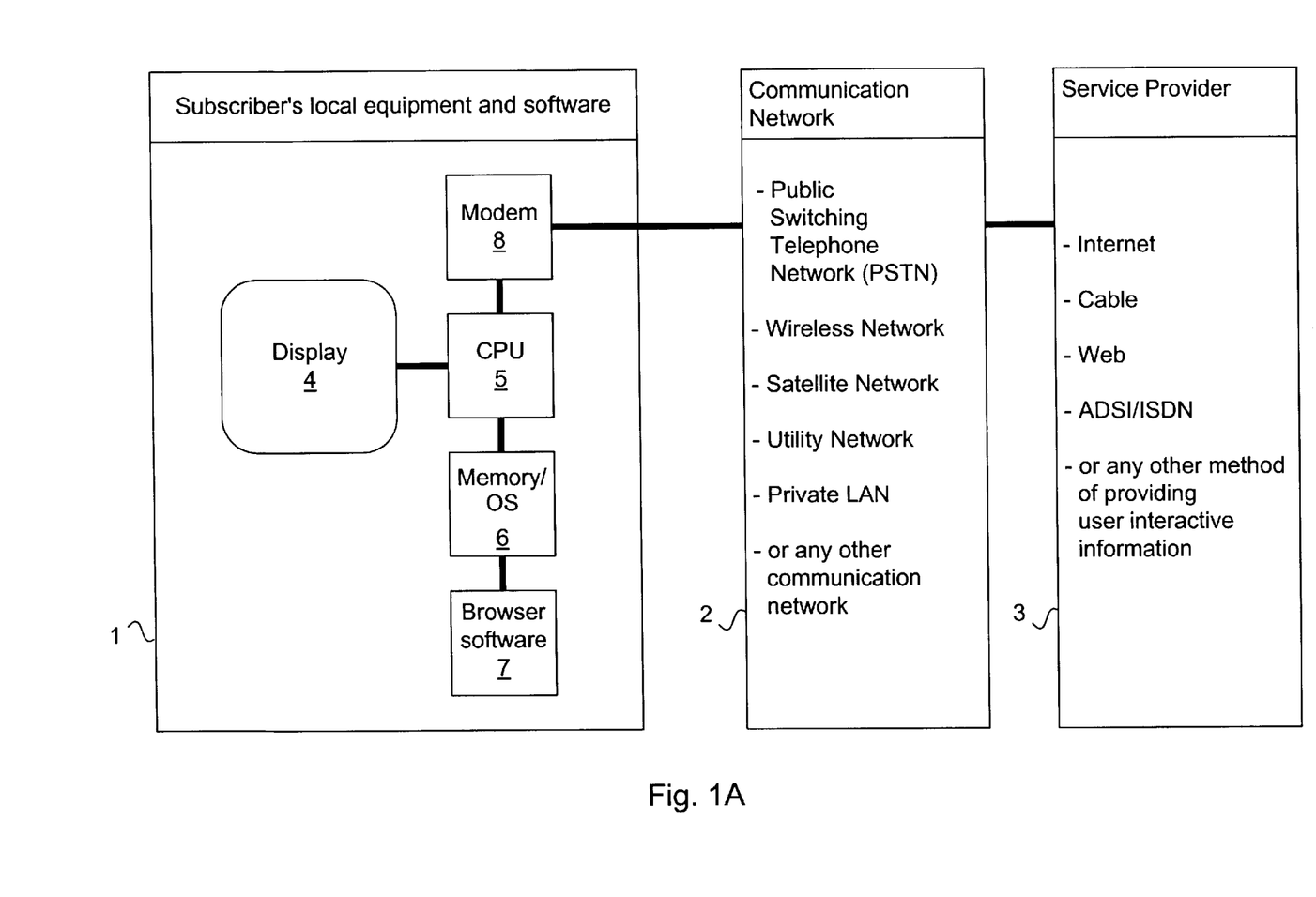
FIG. 1A is a system overview diagram for a system with which user-interactive information content may be viewed by a user.

Referring firstly to FIG. 1A, a system with which user-interactive information content may be viewed by a user/subscriber comprises a subscriber's local equipment and software, generally indicated by 1, a communications network of some sort, generally indicated by 2, and a service provider, generally indicated by 3. The subscriber's local equipment and software 1 includes a display 4, a CPU (central processing unit) 5, a memory/OS (operating system) 6, browser software 7, and a modem 8 connected to the communication network 2. The display 4 may be a display screen of a monitor for example, the display contents of which are controlled by the CPU 5. The communication network 2 may consist of any communications infrastructure capable of exchanging data. For example, it may be a PSTN (public switched telephone network), a wireless network, a satellite network, a utility network, or a private LAN (local area network). The service provider 3 is any system capable of providing user-interactive information content to the user's equipment and software 1 through the communications network 2. It might be an Internet service provider, a cable company, a WWW service provider, ADSL/ISDN (asynchronous digital subscriber line) providers, to name a few examples. Through the communications network 2, the browser software 7 forming part of the subscriber's local equipment and software 1 accesses data provided by the service provider 3, and may do so using any existing or future protocol for data exchange.

User-interactive information content may be divided into one or more pages each having a respective remote access file pointer, this being a URL for the case that the page is a WWW page. A conventional way of browsing a user-interactive information content page will be described with reference to FIG. 1B which shows detailed view of a subscriber's monitor 10 having display 4. A window 12 is opened on the display 4 for the purpose of page browsing. The window 12 has a contents display area 14, an X-scroll area 16 running the length of the display area in the X direction and a Y-scroll area 18 running in the length of the display area in the Y direction. The X-scroll area 16 and Y-scroll area 18 have an X-scroll bar 20 and a Y-scroll bar 22 respectively. When a page is being displayed in display area 14, the scroll bars 20,22 indicate what portion of the page is being shown at any instant in time. The X-scroll area 16 is normalized in length to represent the entire length of the page in the X-direction, with the X-scroll bar 20 indicating the portion of that entire length which is actually being displayed. Similarly, the Y-scroll area 18 is normalized in length to represent the entire length of the page in the Y-direction, with the Y-scroll bar 22 indicating the portion of that entire length which is actually being displayed. A user may scroll through the contents of the page horizontally or vertically by using a pointing device to move the scroll bars 20,22 within the scroll areas 16,18. The window 12 and display area 14 need not occupy the entire display 4. Other windows may also be present.

Figure 1B:
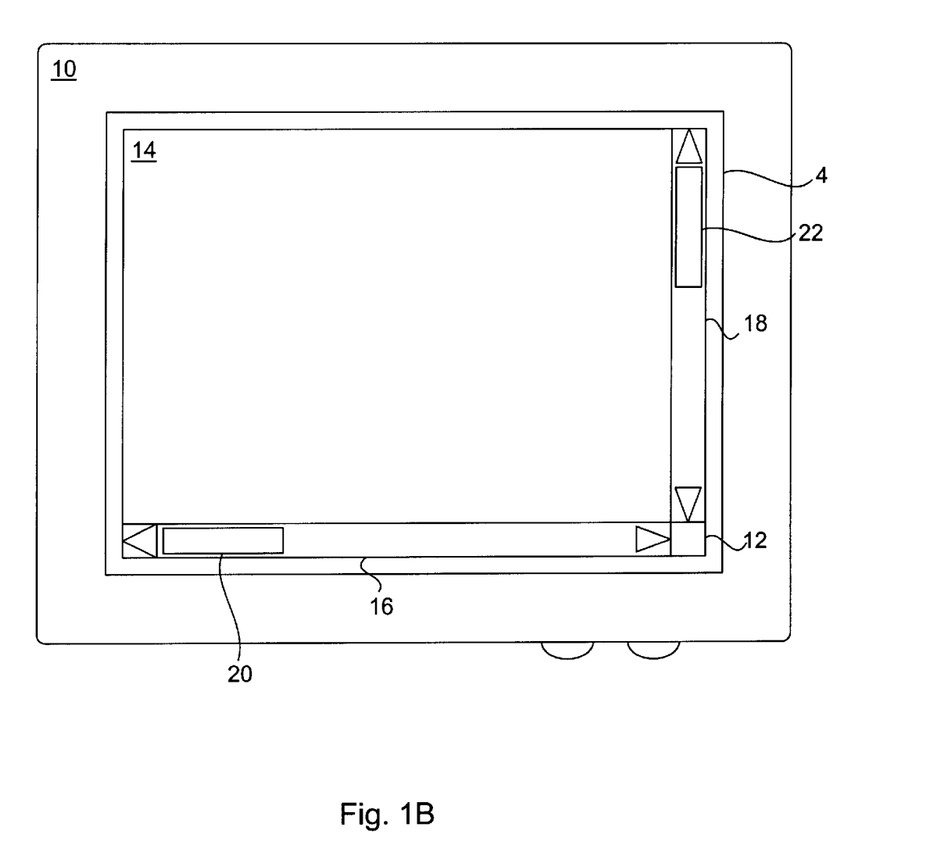
FIG. 1B is a front view of a monitor with a screen display used to view user-interactive information content.

Every point on the display area 14 may be assigned an (X,Y) display coordinate pair (DX,DY) with the display coordinates of the upper left hand corner of the display area being (0,0), and the display coordinates of the lower right hand corner of the display being (DXmax,DYmax). The maximum coordinates (DXmax,DYmax) will change if the size of the display area 14 is changed due to window resizing. The dimensions of the display coordinates may be pixels for example. In addition, each point in the page being viewed may be assigned an (X,Y) page coordinate pair (PX,PY) with respect to the upper left hand point in the page with the upper left hand corner of the page being given the page coordinates (0,0) and the lower right hand corner of the page being given the page coordinates (PXmax,PYmax).

Typically, the first time a page is accessed, a user has found it through the process of browsing. Initially, the page is displayed with the upper left hand corner page coordinates (PX,PY)=(0,0) aligned with the upper left hand display coordinates (DX,DY)=(0,0), in a window having a default window size (WX,WY) where WX and WY are the lengths of the window in the X and Y dimensions respectively. The dimensions reflect whatever the window size was when the page's file pointer was selected. The user scrolls down and/or across through the page to a location of interest, at which point the page coordinates (PX,PY)=(PX1,PY1) will be in the upper left hand corner of the display area. The user may then also adjust the window dimensions to be (WX1, WY1). At this juncture, the page coordinate range defined by the diagonal coordinate pairs (PX1,PY1), (PX2,PY2), where (PX2,PY2)=(PX1+WX1, PY1+WY1) is displayed in the display area.

The user then has the option of storing the remote access file pointer of the page in a bookmark directory. The user may do this by selecting a menu item from the screen display for example. Subsequently, the same page may be visited by selecting the appropriate entry from the bookmark directory. To view the particular area of interest, the user must again scroll down to point (X1,Y1), and must resize the window to (WX1,WY1).

Figure 2:
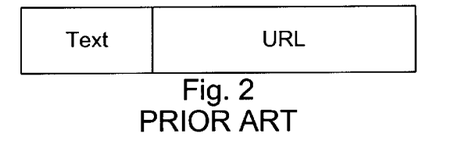
FIG. 2 is a record format of a conventional bookmark.

Referring now to FIG. 2, a conventional WWW bookmark directory has a record for each bookmark. Each record contains a text name for the bookmark which identifies the page to the user, and contains the URL of the page of interest.

According to an embodiment of the invention, an improved type of bookmark, referred to herein as an enhanced bookmark, and an improved bookmarking system is provided. FIGS. 3A,3B,3C,3D,3E and 3F show the record format for improved bookmark directories according to preferred aspects of the invention. A bookmark directory would contain a plurality of records of the type shown in these Figures with each record containing an enhanced bookmark.

Figure 3A:
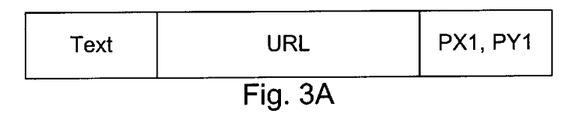
FIGS. 3A,3B,3C,3D,3E, and 3F are record formats for enhanced bookmarks according to embodiments of the invention.

In FIG. 3A, each record in the bookmark directory includes a text name and a remote access file pointer, and additionally includes a single (PX1,PY1) page coordinate pair. This coordinate pair identifies what point of the page identified by the remote access file pointer should be displayed in the upper left hand corner of the window in which the page is to be displayed, i.e. which page coordinates are to be aligned with display coordinates (0,0). As in the prior art systems, the instigation of the creation of such an enhanced bookmark may involve the selection of an icon or a menu item in the screen display or may involve any other type of option selection mechanism available. The remote access file pointer of the current page would then be stored in association with the enhanced bookmark. In addition, whatever (PX1,PY1) point is currently in the upper left hand corner of the display would be stored in the enhanced bookmark. Alternatively, the user may have the option of identifying the particular (PX1,PY1) point, either with a pointer of some sort, or with cursor controls.

Figure 3B:
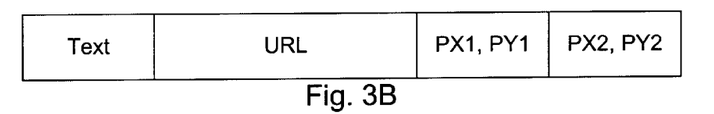

In FIG. 3B, each record in the bookmark directory includes the fields identified with respect to FIG. 3A, and also includes a second (PX2,PY2) coordinate pair. The two coordinate pairs (PX1,PY1) and (PX2,PY2) together identify a portion of the page to be displayed, namely a rectangle having (PX1,PY1) as its upper left hand coordinates, and having (PX2,PY2) as its lower right coordinates. As in the prior art systems, the instigation of the creation of such an enhanced bookmark may involve the selection of an icon or a menu item in the screen display. The remote access file pointer of the current page would then be stored in association with the enhanced bookmark. In addition, whatever (PX1,PY1) point is currently in the upper left hand corner of the display would be stored in the enhanced bookmark, and whatever (PX2,PY2) point is currently in the lower right hand corner would be stored in the enhanced bookmark. Alternatively, the user may have the option of identifying the particular (PX1,PY1) and (PX2,PY2) points, either with a pointer of some sort, or with cursor controls.

Figure 3C:
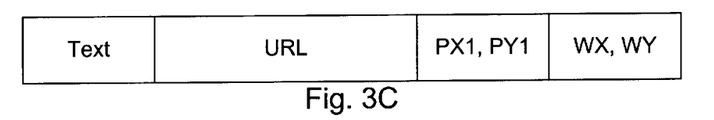

In FIG. 3C, each record in the bookmark directory includes the fields identified with respect to FIG. 3A, and also includes a (WX,WY) dimension pair which identifies the dimensions of the window in which the page is to be displayed. As in the prior art systems, the instigation of the creation of such an enhanced bookmark may involve the selection of an icon or a menu item in the screen display. The remote access file pointer of the current page would then be stored in association with the enhanced bookmark. In addition, whatever (PX1,PY1) point is currently in the upper left hand corner of the display would be stored in the enhanced bookmark. Alternatively, the user may have the option of identifying the particular (PX1,PY1) point, either with a pointer of some sort, or with cursor controls. Finally, the current dimensions (WX,WY) of the window display would also be stored in the bookmark.

Figure 3D:
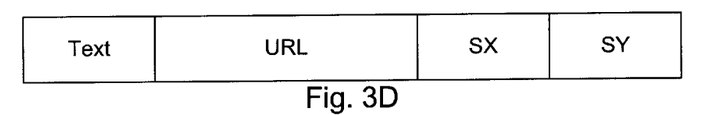

In FIG. 3D, each record in the bookmark directory includes a text field and a remote access file pointer field. In addition, each record contains a scroll bar position pair (SX,SY) which identify the position of the scroll bars when the create enhanced bookmark option was selected.

Figure 3E:
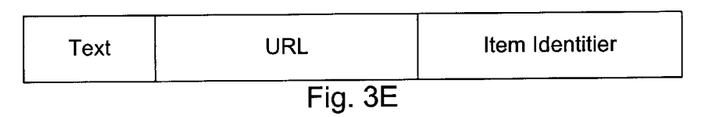
Figure 3F:
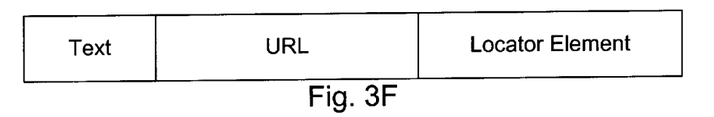

In FIG. 3E, each record in the bookmark directory includes a text field and a remote access file pointer field. In addition, there is an item identifier field present in each record. This item identifier provides a mechanism for searchably locating a portion of the page identified by the remote access file pointer. For example, it could be a string of text that appears at the beginning of a portion of the display which is to be displayed. It could be a string of text that appears before a portion of the display. As in the prior art systems, the instigation of the creation of such an enhanced bookmark may involve the selection of an icon or a menu item in the screen display. The remote access file pointer of the current page would then be stored in association with the enhanced bookmark. In addition, an item identifier which identifies a portion of the display would be stored in the bookmark. This may be an item identifier which immediately precedes the (PX1,PY1) point currently in the upper left hand corner of the display. Alternatively it may be an item identifier currently in the upper left hand corner of the display. Alternatively, the user may have the option of identifying the particular item identifier, either with a pointer of some sort, or with cursor controls. Preferably the item identifier is a relatively static item in the sense that it does not change over time. If an item identifier is selected which is subject to change, it may not be possible to locate the changed item identifier.

Particular examples of enhanced bookmark records have been described with reference to FIGS. 3A–3E. More generally, a record of the type shown in FIG. 3F may be employed. This record includes a text field, remote access file pointer field, and one or more locator element fields. Each locator element may be any of the previously described parameters such as PX1,PY1,PX2,PY2,WX,WY,SX,SY or item identifiers. Furthermore, it is contemplated that other types of locator elements such as HTML anchors, XML (extensible markup language) anchors, or any other types of anchors which may exist now or be developed in the future which are used to display text and graphics in the Internet or other information network, may be employed so long as collectively for each bookmark they make possible the determination of a particular portion of a page to display.

The above examples are particularly suitable for bookmarking of HTML content of the WWW. In addition, frames, JPEG files, GIF files, Java to indentify it as applets, a trademark Quick Time to indentify it as a trademark movies, or other plug-in elements may be pointed to specifically without needing to download the HTML file in which they were originally downloaded.

Of course, a bookmark directory which permits the inclusion of any of the above types of bookmarks would be preferable.

The above discussion has centered upon the creation of various types of enhanced bookmarks. Once such an enhanced bookmark is created, it is accessed using conventional techniques. For example, if the enhanced bookmark is in a directory, then the enhanced bookmark could be selected from the directory in conventional fashion.

For bookmarks of the type described with reference to FIG. 3A, the remote access file pointer would be accessed in conventional fashion, and the complete contents of the page downloaded into memory but not yet displayed. Once the page is downloaded, it is displayed with page coordinate pair (PX1,PY1) in the upper left hand corner of the display area. If a bookmark which is shown in FIG. 3E is used then the page is displayed with the scroll bars moved tot he positions indicated by SX,SY.

For bookmarks of the type described with reference to FIG. 3B, the remote access file pointer would be accessed in conventional fashion, and the complete contents of the page downloaded into memory but not yet displayed. Once the page is downloaded, the range of the page defined by the diagonal coordinate pairs (PX1,PY1), and (PX2,PY2). Preferably, the window is resized such that the display area accommodates this display range exactly.

For bookmarks of the type described with reference to FIG. 3C, the remote access file pointer would be accessed in conventional fashion, and the complete contents of the page downloaded into memory but not yet displayed. The display window is resized such that it has dimensions (WX,WY). Once the page is downloaded, it is displayed with page coordinate pair (PX1,PY1) in the upper left hand corner of the display area.

For bookmarks of the type described with reference to FIG. 3D, the remote access file pointer would be accessed in conventional fashion, and the complete contents of the page downloaded into memory but not yet displayed. Once the page is downloaded, the contents are searched for the item identifier. Once this is found, the contents of the page following the item identifier are displayed starting in the upper left hand corner of the display area, or the page is displayed with the item identified in the upper left hand corner, depending upon the criteria for its selection.

Figure 4A:
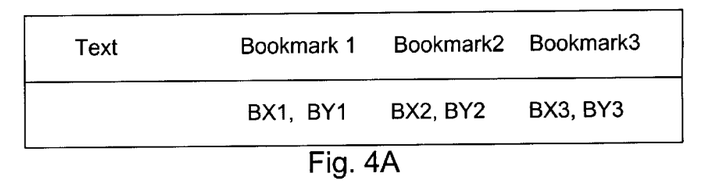
FIG. 4A is a record format for a super-bookmark according to an embodiment of the invention.
Figure 4B:
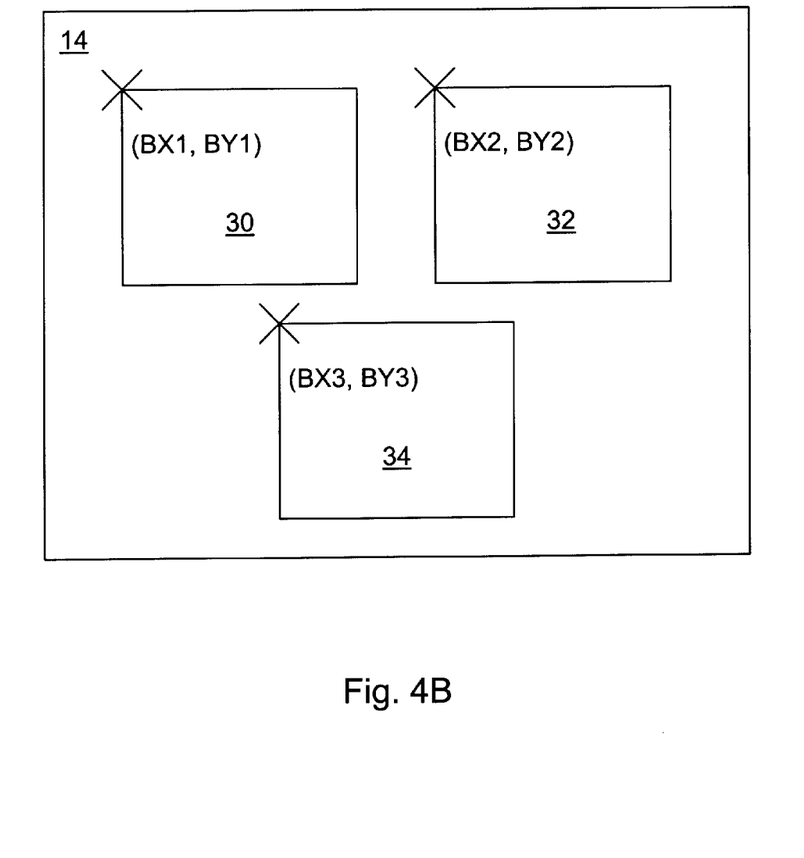
FIG. 4B is a view of a screen display produced from a super-bookmark of FIG. 4A.

In another embodiment of the invention, super-bookmarks are provided which permit the collaging of displays defined by the above identified enhanced bookmarks. FIG. 4A is an example of a super-bookmark record which includes a text field identifying the super-bookmark, and a plurality of enhanced bookmarks or pointers to enhanced bookmarks (three shown), each being one of the types described above. In association with each enhanced bookmark there is stored a respective bookmark coordinate pair (BX,BY) which identifies where in the window to display the material identified by the particular enhanced bookmark. The bookmark coordinate pair in effect redefine the display origin from being located at (0,0) to being at the location identified by the bookmark coordinate pair. The instigation of the creation of such a bookmark may involve the selection of an icon or a menu item in the screen display. The user would then be able to select a number of enhanced bookmarks from the existing bookmark directory. Each such enhanced bookmark preferably represents a predetermined area of screen real estate. The system may be configured to arrange the respective pieces of real estate by defining the bookmark coordinates (BX,BY) such that all of the bookmarked displays fit the screen, or alternatively, a display template may be created which allows the user to define the coordinates (BX,BY) by defining where the respective pieces are to appear. An example of a display area which might result from a super-bookmark containing three enhanced bookmarks is shown in FIG. 4B. The display area 14 contains three sub-displaying areas 30,32,34 each displaying contents pointed to by a first, second and third bookmark respectively, which have the bookmark coordinates (BX1,BY1), (BX3,BY2) and (BX2,BY3) as their upper left hand display coordinates respectively. These points now become the origin for each sub-display. For example, if the first bookmark is of the type illustrated in FIG. 3B and this includes first and second page coordinate pairs (PX1,PY1) (PX2,PY2), the page identified by the bookmark's remote access file pointer is displayed with the page coordinate pair (PX1,PY1) aligned with (BX1,BY1), the new origin.

Alternatively, the system may be configured to spawn a separate window for each enhanced bookmark in the super-bookmark, and arrange the windows in a non-overlapping fashion on the screen display. In this case, each bookmark does not necessarily have to be an enhanced bookmark assuming that the windows are individually scrollable.

In the context of the WWW, a super bookmark need not only contain enhanced bookmarks from different websites/ servers. It may also contain enhanced bookmarks from the same website or web page. For instance, the first part of a superbookmark may point to a portion of a web page containing a search field/text entry field and send button. A second part of the superbookmark may point to the results page (usually referred to by a cgi) like http://www.yahoo.com/search.cgi=<some text to search> using either the post or get method (hidden or viewed sending of text field). This would allow the user a rapid method of initializing new searches without scrolling.

Figure 5A:
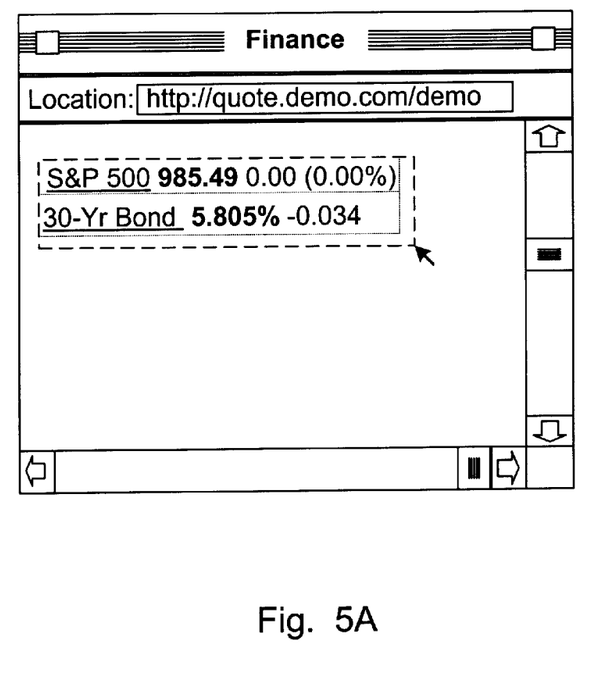
FIGS. 5A, 5B, 5C and 5D are example screen displays for another method of creating a super-bookmark.
Figure 5B:
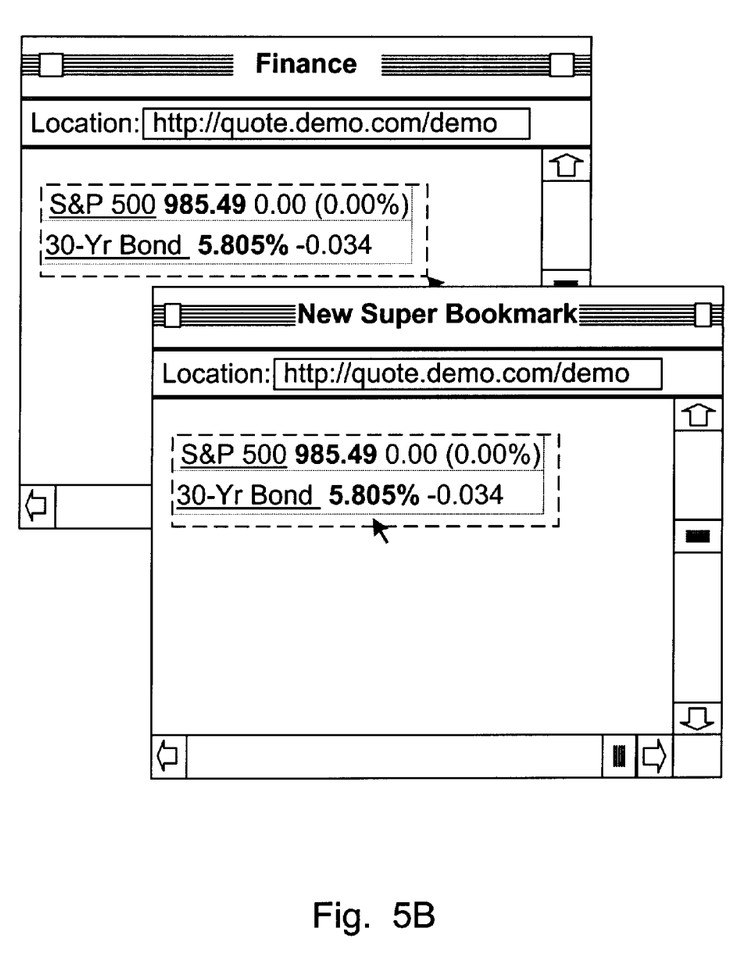
Figure 5C:
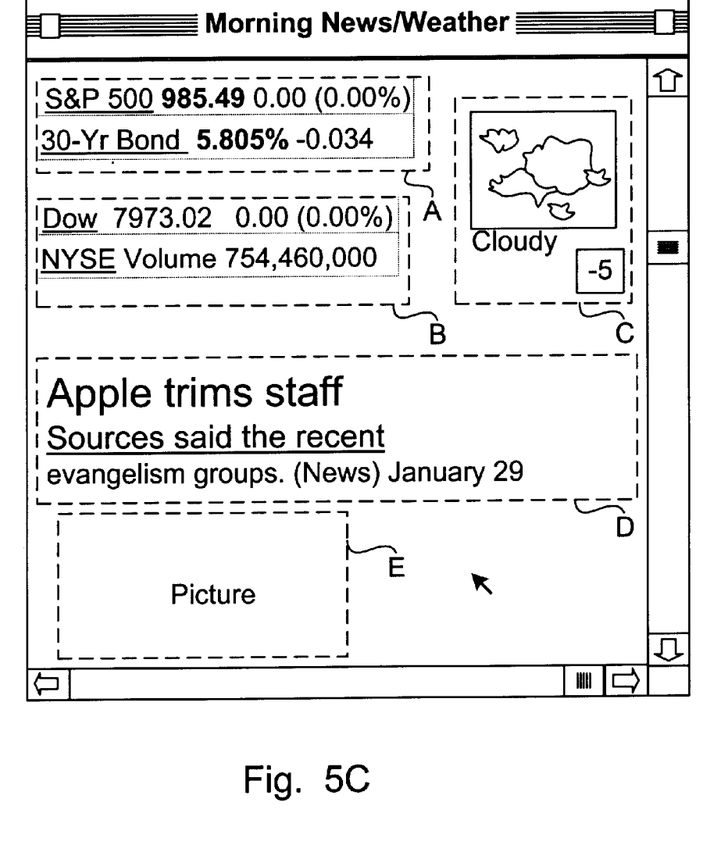

In the above super-bookmarking option, previously existing enhanced bookmarks or bookmarks are selected to create the superbookmark. Alternatively, the super-bookmark can be created in real time. A user may select a portion of a displayed page for example as shown in FIG. 5A and paste this portion into a "new super-bookmark" window such as shown in FIG. 5B. By doing this repeatedly, a "new-superbookmark" window such as shown in FIG. 5C may be generated. In this example, the superbookmark contains tiles or clippings labelled A,B,C,D,E from five pages (some of which may be the same page), and the superbookmark which is stored contains the enhanced bookmark information needed to identify each tile and also contains bookmark coordinates locating where the tile is to be displayed.

Figure 5D:
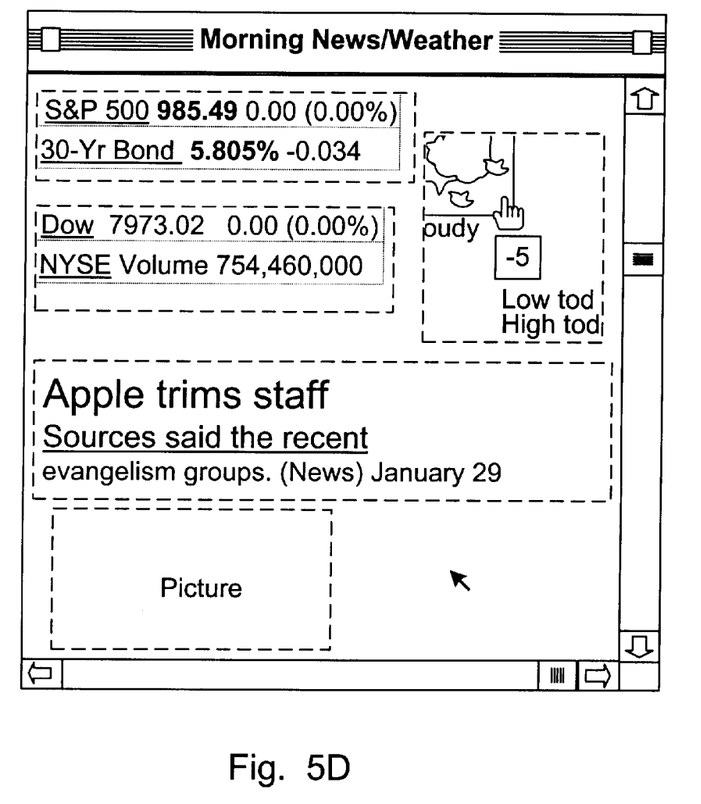

Preferably, the system would provide the option of moving, adding, deleting tiles, and scrolling within the super-bookmark window. Furthermore, the user is preferably given the option of scrolling within a tile using a hand tool, such as illustrated in FIG. 5D.

With any of the above described enhanced bookmark types, depending upon the nature of the material being downloaded, and on the particular source of the material being downloaded, it may or may not be possible to download a specific subset of a page. Furthermore, again depending upon the nature of the material being downloaded, it may or may not be possible to deduce the size of items being downloaded without downloading them completely. For example, in the context of the WWW, the (X,Y) coordinates of items on a page move around during the loading of the page, and are not fixed until everything above a particular item has been downloaded. This is because the download of the page does not necessarily happen completely sequentially. Sometimes all of the text will be downloaded first, followed by graphic images and charts which are inserted into the text, and which shift the text around from its initial position. However, the size of an item such as a graphic image is usually determinate at the beginning of its download. For example, in HTML files, graphic images include a width and height parameter which determine the size of the image.

Different downloading methods will now be described with reference to FIGS. 6A, 6B and 6C.

Figure 6A:
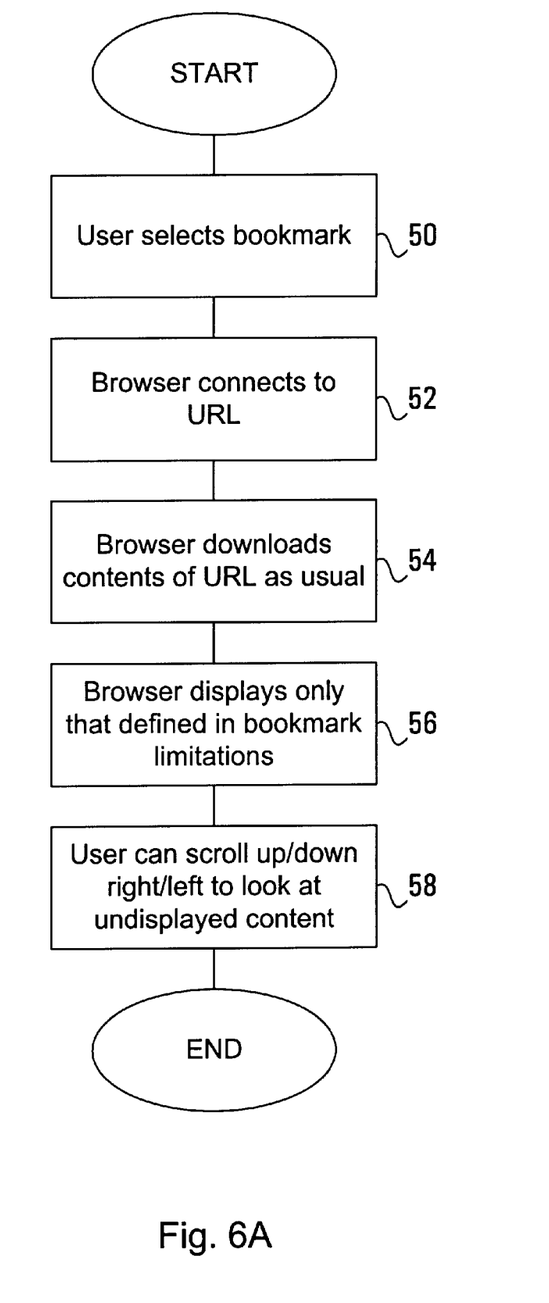
FIGS. 6A, 6B and 6C are flowcharts for downloading information pointed to by the bookmarks of FIGS. 3A,3B, 3C,3D,3E, 3F or 4A.

Referring firstly to FIG. 6A, a flowchart is shown for a downloading method which assumes that before an (X,Y) position in downloaded information can be determined, everything above that position must have been downloaded. In step one 50, the user selects an enhanced bookmark from the bookmark directory. In step two 52, the user's computer connects to the remote access file pointer included in the bookmark. In step three 54, the browser downloads the entire contents of the page in the usual fashion with the exception of the fact that the contents are not yet displayed in the display, thereby creating a virtual copy of the entire page in memory. In step four, the browser displays the subset of the virtual page which is identified by the enhanced bookmark 56. At that point 58, since the entire page is in memory, the user can scroll up and down as usual view the remainder of the page.

Figure 6B:
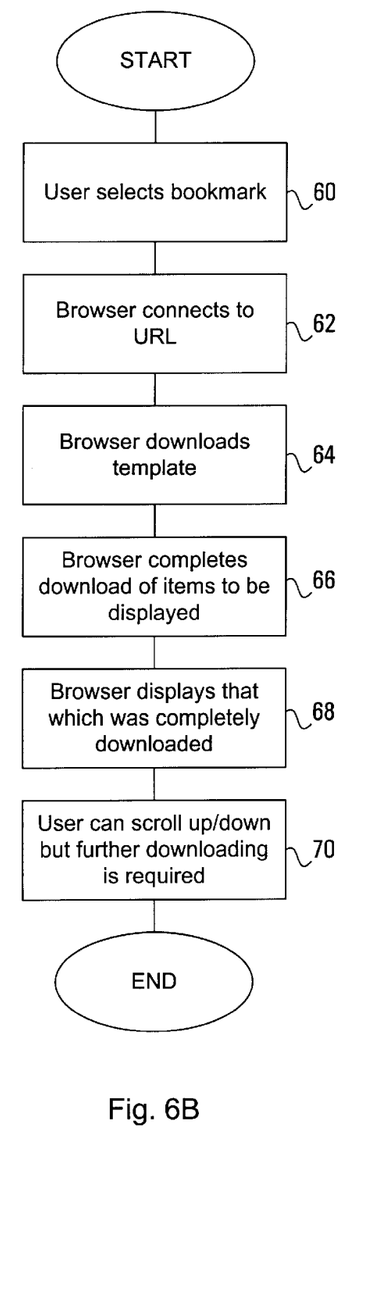

Referring next to FIG. 6B, a flowchart is shown for a downloading method which assumes that before an (X,Y) position in downloaded information can be determined, a template of everything above that position must be created. In step one 60, the user selects an enhanced bookmark from the bookmark directory. In step two 62, the user's computer connects to the remote access file pointer included in the bookmark. In step three 64, the browser downloads the contents of the page item by item, but only enough to determine the screen space that the item occupies (for example the above identified width and height of an HTML graphic image). In the case of text, this usually requires the entire text to be downloaded. In the case of graphics, usually at the beginning of the download it is possible to determine the shape and size of the image. Enough items are downloaded until a template which covers the subset of the page identified by the enhanced bookmark has been created. Preferably, a template for the entire page is completed. In HTML, this would simply comprise downloading the entire HTML file not including the graphic images. In step four 66, the complete versions of everything falling within the subset are downloaded and displayed 68. At that point, depending upon the particular implementation, the user may or may not be able to scroll up and down as usual to view the remainder of the page 70. Scrolling of the downloaded template could be performed, and optionally, graphics images outside the subset which should appear on the screen after scrolling could be downloaded and displayed.

Figure 6C:
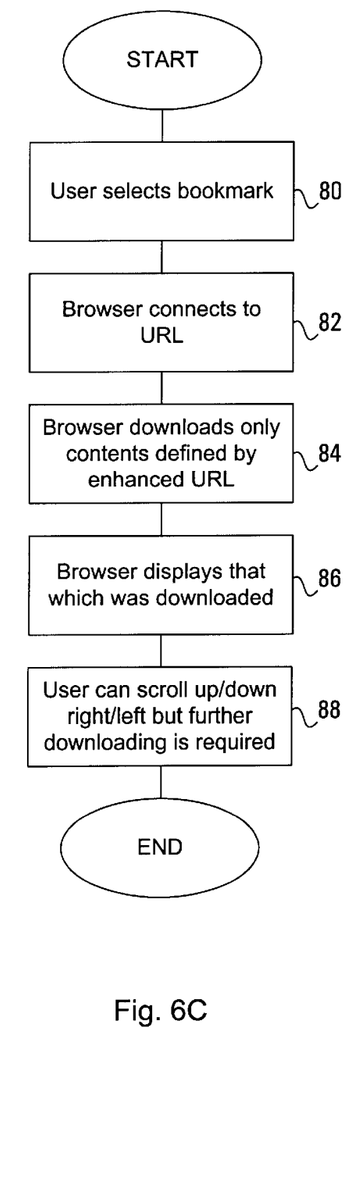

Referring next to FIG. 6C, a flowchart is shown for a downloading method which assumes a specific subset of a page of information can be downloaded directly without the need to download anything before or after the specific subset. In step one 80, the user selects an enhanced bookmark from the bookmark directory. In step two 82, the user's computer connects to the URL included in the bookmark. In step three 84, the browser downloads the specific subset of the page of information. In step four 86, the browser displays the specific subset. At that point, since only the specific subset will be in memory, the user will be unable to scroll up and down as usual to view the remainder of the page 88. Rather, a new specific subset of information must be downloaded to fill the new portion of the window which is displayed.

Any of the above methods can be applied to the downloading of information identified by a super-bookmark.

Preferably, the invention resides completely within the subscriber's local equipment/software and has no impact on the communications network or service provider.

Numerous modifications and variations of the present invention are possible in light of the above teachings. It is therefore to be understood that within the scope of the appended claims, the invention may be practised otherwise than as specifically described herein.

In the above described embodiment, it is assumed that a computer with a processor, memory and monitor is used to provide the improved bookmarking system. More generally, any processing platform and display combination may be used. For example, a set-top box and television screen, hand held web browsers, screen-based telephone sets etc.

A particular scrolling mechanism has been described with reference to FIG. 1A. Of course, any type of scrolling mechanism may be employed with embodiments of the invention which permit scrolling. For example, the scroll bars may be functions which can be turned on or off. Furthermore, the option of moving a curser with a mouse or a key to effect may be provided.

The embodiments of the invention in which an exclusive property or privilege is claimed are defined as follows:

1. A method of providing enhanced user-interactive information content bookmarking in the context of page access from a remote service provider, comprising the steps of:

a) selection of the creation or the use of an enhanced bookmark;
b) in the process of creating an enhanced bookmark:
   i) accessing a page having a remote access file pointer;
   ii) selecting a create enhanced bookmark option;
   iii) storing the remote access file pointer in an enhanced bookmark;
   iv) also storing in the enhanced bookmark at least one locator element identifying a user selected position within the page;
c) in the process of using an enhanced bookmark:
   i) selecting a previously created enhanced bookmark;
   ii) downloading into memory the page identified in the remote access file pointer of the selected enhanced bookmark;
   iii) displaying in a display window a subset of the downloaded page, the subset being determined by said at least one locator element.

2. A method according to claim 1 wherein points in said page each have an (X,Y) coordinate pair, and the at least one locator element comprises a particular (X,Y) coordinate pair of a particular point in the page.

3. A method according to claim 2 wherein said step of displaying the subset of the downloaded page comprises displaying the page with said particular point in the upper left hand corner of the display window.

4. A method according to claim 1 wherein said locator element comprises an item identifier which is searchable within said page, wherein said step of displaying the subset of the downloaded page comprises:

searching the downloaded page for said item identifier;
displaying the contents of the page starting with said item identifier, or the contents of the page immediately following the item identifier.

5. A method according to claim 1 wherein said locator element is determined on the basis of the position of the page within the display window when the create enhanced bookmark option is selected.

6. A method according to claim 1 wherein the page is a world wide web page and the remote access file pointer is a universal resource locator.

7. A method of providing enhanced user-interactive information content bookmarking in the context of page access from a remote service provider, comprising the steps of:

a) selection of the creation or the use of an enhanced bookmark;
b) in the process of creating an enhanced bookmark:
   i) accessing a page having a remote access file pointer;
   ii) selecting a create enhanced bookmark option;
   iii) storing the remote access file pointer in an enhanced bookmark;
   iv) also storing in the enhanced bookmark at least one locator element identifying a user selected position within the page;
c) in the process of using an enhanced bookmark:
   i) selecting a previously created enhanced bookmark;
   ii) downloading into memory the page identified in the remote access file pointer of the selected enhanced bookmark;
   iii) displaying in a display window a subset of the downloaded page, the subset being determined by said at least one locator element;
wherein points in said page each have an (X,Y) coordinate pair, and the at least one locator element comprises a first (X,Y) coordinate pair of a first point in the page, and a second (X,Y) coordinate pair of a second point in the page.

8. A method according to claim 7 wherein said step of displaying the subset of the downloaded page comprises displaying a rectangular portion of the page defined by said first and second coordinate pairs as its upper left and lower right corners respectively with said first (X,Y) coordinate pair in the upper left hand corner of the display window.

9. A method according to claim 8 further comprising the step of resizing the display window to accommodate said rectangular portion.

10. A method of providing enhanced user-interactive information content bookmarking in the context of page access from a remote service provider, comprising the steps of:
 a) selection of the creation or the use of an enhanced bookmark;
 b) in the process of creating an enhanced bookmark:
  i) accessing a page having a remote access file pointer;
  ii) selecting a create enhanced bookmark option;
  iii) storing the remote access file pointer in an enhanced bookmark;
  iv) also storing in the enhanced bookmark at least one locator element identifying a user selected position within the page;
 c) in the process of using an enhanced bookmark:
  i) selecting a previously created enhanced bookmark;
  ii) downloading into memory the page identified in the remote access file pointer of the selected enhanced bookmark;
  iii) displaying in a display window a subset of the downloaded page, the subset being determined by said at least one locator element;
 wherein step c)iii) further comprises the step of resizing the display window to permit the display of a certain portion of the page, the display window after resizing having X and Y dimensions WX and WY respectively, points in said page each have an (X,Y) coordinate pair, and the at least one locator element comprises a particular (X,Y) coordinate pair of a particular point in the page, and said dimensions WX and WY.

11. A method according to claim 10 wherein said step of displaying the subset of the downloaded page comprises the step of resizing the display window to have said dimensions WX and WY, and displaying the page with said particular point in the upper left hand corner of the display window.

12. A method of providing enhanced bookmarking in the context of accessing a page of user-interactive information content from a remote service provider comprising:
 a) creating a superbookmark by selecting for inclusion in the superbookmark a plurality of bookmarks each containing a respective remote access file pointer;
 b) in the process of using a superbookmark:
  i) selecting a previously created superbookmark;
  ii) downloading into memory a page identified in the remote access file pointer of each of the bookmarks identified by the superbookmark;
  iii) displaying in a display window a respective subset of each of the downloaded pages.

13. A method according to claim 12 wherein each bookmark is an enhanced bookmark which also contains a respective locator element wherein in step b)iii), the subset of each of the downloaded pages is identified by the respective locator element.

14. A method according to claim 13 further comprising creating each said enhanced bookmark by:
 i) accessing a respective page having a respective remote access file pointer;
 ii) selecting a create enhanced bookmark option;
 iii) storing the remote access file pointer in a respective enhanced bookmark;
 iv) also storing in the respective enhanced bookmark a respective at least one locator element.

15. A method of providing enhanced bookmarking in the context of accessing a page of user-interactive information content from a remote service provider comprising:
 a) a user selecting a create super-bookmark option;
 b) creating a plurality of enhanced bookmarks by executing, for each enhanced bookmark, the steps of:
  i) accessing a respective page having a respective remote access file pointer;
  ii) storing the remote access file pointer in the enhanced bookmark;
  iii) also storing in the enhanced bookmark a respective at least one user selected locator element;
 c) creating a superbookmark record by selecting a plurality of enhanced bookmarks;
 d) in the process of using a superbookmark:
  i) selecting a previously created superbookmark;
  ii) downloading into memory the page identified in the remote access file pointer of each of the enhanced bookmark identified by the superbookmark;
  iii) displaying in a display window a respective subset of each of the downloaded pages, the respective subset being determined by said respective at least one locator element.

16. An enhanced bookmarking system for use in a processing platform connectable to a service provider for providing enhanced bookmarking of pages of user-interactive information content, the processing platform being connected to a display, the system comprising:
 a memory for storing enhanced bookmarks, each enhanced bookmark containing a remote access file pointer and at least one locator element;
 a browser for accessing a page having a remote access file pointer and displaying the page on the display, the browser having a create enhanced bookmark option which when selected stores the remote access file pointer of the currently displayed page and at least one user selected locator element in a new enhanced bookmark in said memory;
 the browser having an access bookmark option which provides for the selection of a particular one of said enhanced bookmarks in said memory, which upon selection of a particular enhanced bookmark downloads into memory the page identified in the file access pointer of the selected enhanced bookmark record and displays on said display a subset of the downloaded page, the subset being determined by said at least one locator element.

17. A system according to claim 16 wherein points in said page each have an (X,Y) coordinate pair, and the at least one locator element comprises a particular (X,Y) coordinate pair of a particular point in the page.

18. A system according to claim 16 wherein said locator element comprises an item identifier which is searchable within said page, said system further comprising:
 a searching mechanism the downloaded page for said item identifier;
 wherein the contents of the page starting with said item identifier or the contents of the page immediately following the item identifier are displayed.

19. A system according to claim 16 wherein the page is a world wide web page and the remote access file pointer is a universal resource locator.

20. An enhanced bookmarking system for use in a processing platform connectable to a service provider for providing enhanced bookmarking of pages of user-interactive information content, the processing platform being connected to a display, the system comprising:

a memory for storing enhanced bookmarks, each enhanced bookmark containing a remote access file pointer and at least one locator element;

a browser for accessing a page having a remote access file pointer and displaying the page on the display, the browser having a create enhanced bookmark option which when selected stores the remote access file pointer of the currently displayed page and at least one user selected locator element in a new enhanced bookmark in said memory;

the browser having an access bookmark option which provides for the selection of a particular one of said enhanced bookmarks in said memory, which upon selection of a particular enhanced bookmark downloads into memory the page identified in the file access pointer of the selected enhanced bookmark record and displays on said display a subset of the downloaded page, the subset being determined by said at least one locator element;

wherein points in said page each have an (X,Y) coordinate pair, and the at least one locator element comprises a first (X,Y) coordinate pair of a first point in the page, and a second (X,Y) coordinate pair of a second point in the page.

21. A superbookmarking system for use in a processing platform connectable to a service provider for providing enhanced bookmarking of pages of user-interactive information content, the processing platform being connected to a display, the system comprising:

a memory for storing a super-bookmark record, a selecting mechanism for selecting a plurality of user-interactive information content pages, each page having a remote access file pointer;

the processing platform storing the remote access file pointers in said super-bookmark record a browser having an access super-bookmark option which provides for the selection of a super-bookmark record in said memory, which upon selection downloads into memory the pages identified in the remote file access pointers of the selected superbookmark record and displays on said display each downloaded page.

22. A system according to claim 21 wherein:

said selecting mechanism further comprises means for selecting a portion of each selected page, and each portion having at least one locator element;

wherein said processing means stores the locator elements in conjunction with the respective remote file access pointers;

and wherein said browsing means only displays a subset of each downloaded page, the subset being determined by the respective locator element(s).

23. A system according to claim 21 wherein said selecting mechanism comprises means for selecting previously created enhanced bookmarks, each enhanced bookmark containing a remote file access pointer and at least one locator element.

24. A system according to claim 21 wherein super-bookmark also contains bookmark coordinates which identify a location in the composite display where the respective subsets are to be displayed, wherein said browser displays each subset at the identified location.

* * * * *